Aug. 17, 1926.
G. C. MARTIN
VALVE
Filed Nov. 30, 1923
1,596,202
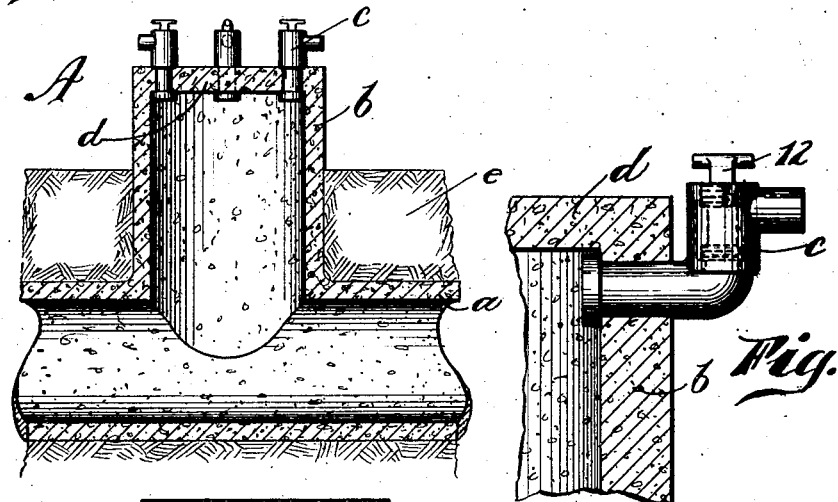
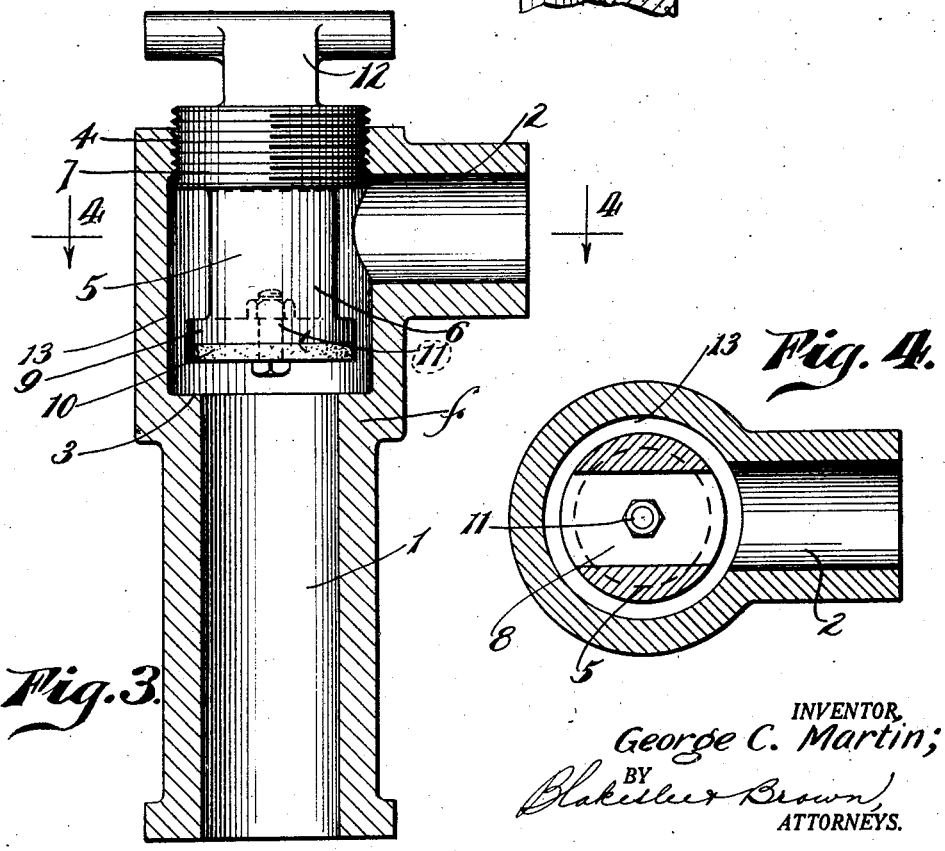
INVENTOR
George C. Martin;
BY
Blakeslee & Brown
ATTORNEYS.

Patented Aug. 17, 1926.

1,596,202

UNITED STATES PATENT OFFICE.

GEORGE C. MARTIN, OF LOS ANGELES, CALIFORNIA.

VALVE.

Application filed November 30, 1923. Serial No. 677,708.

This invention relates to valves broadly, and more particularly to a valve which may be utilized for reducing flow-pressure from irrigating "stands". At the present time a customary procedure is to provide at one side of an orchard a long conduit termed a main-flow conduit which is adapted to permit flow of water therethrough to various spaced "stands" connected with such main conduit. The said "stands" may be provided with a series of spaced openings, exit through such openings from such "stands" being regulated by a series of slide valves. The "stands" are ordinarily open at the top and ditches are dug in the orchard for the purpose of conducting water from such exit portions of the "stands" under control of such valves during an irrigation of the orchard. Very few of the slide valves are water tight and there is a constant seepage of water between the valve seats and the gates thereof. It is highly essential in this type of "stand" to produce a volume flow without undue pressure, for the reason that water under pressure will of course wear away the earth and deepen the ditch, as well as pack the earth, which is undesirable, as it prevents ready penetration of water into the ground. An object of this invention is therefore to produce a volume flow of water without undue pressure sufficient to wear away or cut away earth and still prevent any leakage of water to the various ditches when the valves are properly turned to cut flow of water to such ditches.

Other objects of the invention will appear as the description of the invention proceeds.

With the above and other objects in view, the invention consists in the novel arrangement of the various parts, members and features, as disclosed in one of its embodiments in the accompanying drawing, described generally and finally pointed out in claims.

In the drawing:

Figure 1 is a fragmentary cross sectional elevation of a "stand", a main conduit, the improved valve being associated with the "stand" for conducting water from the "stand" to ditches in the earth, said earth being shown surrounding the main conduit and a portion of the "stand;"

Figure 2 is a fragmentary detail on an enlarged scale from that of Figure 1, showing a part of the "stand" and a modified form of valve casing;

Figure 3 is a vertical elevation on an enlarged scale, of the valve; and,

Figure 4 is a cross sectional view on the line 4—4 of Fig. 3 and looking in the direction of the appended arrows.

Corresponding parts in all the figures are designated by the same reference characters.

Referring with particularity to the drawing a unit valve control system as depicted in Figure 1 is designated as an entirety by A, and of such unit system $a$ is a main conduit for the conducting of a fluid, such as water, to a "stand" $b$ with a valve or valves $c$ associated with the stand for conducting water within such "stand" to points of distribution. The conduit $a$ may be sunk beneath the surface of earth formation $e$, and it is to be noted that the "stand" $b$ is likewise surrounded in part by such earth formation $e$. Normally the "stand" $b$ is filled with water when the conduit $a$ has been filled or has flowing water therein, and flow from such "stand" is accommodated through the valves $c$, the valves $c$ in turn having pipes associated therewith, if desired, leading to furrows or ditches in the earth formation $e$. In the showing, however, water from the "stand" $b$ is conducted through the valves and allowed to escape through valve outlet ports or members and then dropped to the earth into the furrows or ditches. Ordinarily, as stated, the "stand" $b$ would be open at the top and a series of transverse ports would be formed in such "stand" with the exit from such ports controlled by means of slide valves. However, in the present instance the "stand" is provided with a top or cover $d$ which may be detachably placed thereon or as shown integrally formed with the sides of the "stand" as desired. As has been pointed out, it is a prime essential to overcome initial pressure of water striking the earth formation $e$ and rapidly cutting it away. In the present instance the valves $c$ are so constructed as to reduce pressure of the water or other fluid flowing from said valves so as to produce a volume flow without undue pressure.

Referring to Figure 3 I have accomplished the object desired by providing a valve casing $f$ having a part formed with a bore 1 termed the intake orifice, and with a bore 2 substantially at right angles although not necessarily so, to the first orifice 1, which orifice 2 is termed the outlet orifice. The casing $f$ is provided with a shoulder or valve seat portion 3, and likewise said casing in alignment with the axis of such orifice 1, is bored and threaded as shown at 4 for reception of a valve member 5, which valve includes a shank 6 carrying a screw-threaded enlarged portion 7 adapted for screw-threaded engagement with the threaded portion 4 of the casing, and which shank is transversely slotted as shown at 8. Furthermore, the said shank is provided with a head 9 adapted to carry a washer 10, which washer is held to the part 9 by means of a bolt 11. The valve likewise is provided with a handle 12 whereby said valve may be turned, and it is to be noted that upon a turning of such valve the gasket or washer 10 may be seated upon the valve seat or shoulder 3. A cylindrical valve chamber 13, within which the valve operates and likewise which permits communication between the orifices 1 and 2, is larger than the valve head 9; thus when fluid is allowed to pass upwardly through the orifice 1 into the valve chamber the said fluid, assuming the valve in the position shown in Figure 3, will strike against the gasket 10, and flow around such gasket and the valve head into the space included between such head 9 and gasket 10 and the inner surface of the wall forming the chamber 13 and then through the slot 8 produced in the shank 5 of such valve. The water or other fluid is then allowed to escape from the chamber through the outlet orifice 2. It will be noted that the gasket 10 acts as a baffle member for initially buffing the water. The water in its flow, in a measure, forms an eddy in the slot 8 of the shank. In other words, the cross sectional area included between the inner surface wall of the chamber and the periphery of the head and gasket or washer 10, is less than the cross sectional area immediately above such head 9, and as a consequence the pressure flow of water or other fluid is reduced, the volume of the flow of water remaining substantially the same. It might be said that this particular form of valve provides zones of high pressure, and of reduced pressure to produce a volume flow of fluid passed through the valve.

Figure 2 shows an adaptation of the valve to an opening in the side of the "stand" b, the principle of the valve, however, remaining the same.

Water will fill the "stand" b, then flow outwardly from such "stand" through outlet orifices at the will and control of the operator. Obviously from the construction shown dripping and flow of water when not needed is prevented.

Having thus disclosed my invention, I claim and desire to secure by Letters Patent:

1. A valve of the class described including a valve housing provided with a reduced inlet and an outlet extending at right angles to the inlet, the outlet being in a plane above the inlet, a valve seat formed at the junction of said inlet with said housing, a valve within the housing having a head to engage said seat and close the intake, said head being of less diameter than the diameter of the housing, a shank extending from said head through said housing and intersecting the path of the outlet, said shank having a slot extending transversely therethrough and adapted to be located opposite the outlet when the valve is opened, whereby an eddy is formed in the fluid passing through the housing thereby reducing the pressure of the flowing water without decreasing its volume.

2. Improvements in valves including a valve housing having a cylindrical chamber with a reduced intake orifice and a valve seat formed at the junction of said orifice with said chamber, a valve located in said chamber and having a head in axial alinement with the intake orifice said head being of less diameter than the diameter of the chamber, said chamber having a laterally extending outlet at a point near the top thereof spaced from said inlet with the valve head below the outlet, the said valve having a slotted shank located in the path of the fluid to the outlet orifice whereby the pressure of fluid passing through the chamber is reduced without decreasing the volume.

In testimony whereof, I have signed my name.

GEORGE C. MARTIN.